(12) United States Patent
Wang et al.

(10) Patent No.: US 11,915,667 B2
(45) Date of Patent: Feb. 27, 2024

(54) METHOD AND SYSTEM FOR DISPLAYING CORRECTED IMAGE, AND DISPLAY DEVICE

(71) Applicant: BOE TECHNOLOGY GROUP CO., LTD., Beijing (CN)

(72) Inventors: Xian Wang, Beijing (CN); Ran Duan, Beijing (CN); Masakazu Okamura, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 275 days.

(21) Appl. No.: 17/361,399

(22) Filed: Jun. 29, 2021

(65) Prior Publication Data
US 2021/0407460 A1    Dec. 30, 2021

(30) Foreign Application Priority Data
Jun. 30, 2020 (CN) .......................... 202010613610.4

(51) Int. Cl.
*G09G 5/00* (2006.01)
*G09G 5/06* (2006.01)
*G09G 3/20* (2006.01)

(52) U.S. Cl.
CPC ............. *G09G 5/06* (2013.01); *G09G 3/2003* (2013.01); *G09G 2320/0666* (2013.01); *G09G 2360/16* (2013.01)

(58) Field of Classification Search
CPC ................... G09G 5/06; G09G 3/2003; G09G 2320/0666; G09G 2320/0242
See application file for complete search history.

(56) References Cited

U.S. PATENT DOCUMENTS

| 2016/0027366 A1* | 1/2016 | Nakanishi ................ G09G 5/02 345/694 |
| 2018/0295356 A1* | 10/2018 | Lee ........................ H04N 17/02 |
| 2020/0126503 A1* | 4/2020 | Tsai ..................... G09G 3/3614 |

FOREIGN PATENT DOCUMENTS

JP         2015179951         * 8/2015

* cited by examiner

*Primary Examiner* — Roy P Rabindranath
(74) *Attorney, Agent, or Firm* — Lippes Mathias LLP

(57) ABSTRACT

Provided is a method for displaying an image including: acquiring a to-be-displayed image; correcting the to-be-displayed image based on a target look-up table, wherein in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and displaying a corrected to-be-displayed image.

20 Claims, 5 Drawing Sheets

METHOD AND SYSTEM FOR DISPLAYING CORRECTED IMAGE, AND DISPLAY DEVICE

CROSS REFERENCE TO RELATED APPLICATION

This application is based on and claims priority to the Chinese Patent Application No. 202010613610.4, filed on Jun. 30, 2020, and entitled "METHOD AND SYSTEM FOR DISPLAYING IMAGE, AND DISPLAY DEVICE", the disclosure of which is herein incorporated by reference in its entirety.

TECHNICAL FIELD

The present disclosure relates to a method and system for displaying an image and a display device.

BACKGROUND

With the development of display technologies, there is an increasing demand for image quality of a display device. However, there is a certain degree of difference between the image displayed by the current display device and the image that actually needs to be displayed by the display device, which results in distortion of the image. Therefore, it is necessary to correct the image displayed by the display device, such that the image displayed by the display device is closer to the image that actually needs to be displayed.

Generally, the display device can correct an image by using a look-up table. The look-up table is, for example, a 3D Look-Up-Table (3D LUT).

SUMMARY

The present disclosure provides a method and system for displaying an image and a display device. The technical solutions are as follows.

In a first aspect, a method for displaying an image is provided. The method is applicable to a display device and includes:

acquiring a to-be-displayed image;

correcting the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and displaying a corrected to-be-displayed image.

Optionally, the pixel value of the first pixel is determined based on the original pixel value and an opto-electrical transfer function (OETF), and the pixel value of the second pixel is determined based on the corrected pixel value and the OETF.

Optionally, before correcting the to-be-displayed image based on the target look-up table, the method further includes:

acquiring an initial look-up table, wherein the initial look-up table is intended to record corrected pixel values corresponding to the plurality of original pixel values; and acquiring the target look-up table by updating the corrected pixel values in the initial look-up table;

wherein updating the corrected pixel value corresponding to any original pixel value includes:

when an absolute value of a difference between a third chroma and a fourth chroma is greater than the chroma difference threshold, adjusting the corrected pixel value at least once until the absolute value of the difference between the third chroma and the fourth chroma as adjusted is less than or equal to the chroma difference threshold; wherein the third chroma is a chroma of a third pixel, a pixel value of the third pixel being acquired by converting the original pixel value, and the fourth chroma is a chroma of a fourth pixel displayed by the display device, a pixel value of the fourth pixel being acquired by converting the corrected pixel value.

Optionally, the pixel value of the third pixel is determined based on the original pixel value and the OETF; and the fourth chroma is a chroma of a fourth pixel displayed by the display device, the pixel value of the fourth pixel is determined based on the corrected pixel value and the OETF.

Optionally, the corrected pixel value includes: a red component, a green component and a blue component;

adjusting the corrected pixel value includes:

adjusting the red component and the blue component when an absolute value of a difference between an abscissa of the third chroma and an abscissa of the fourth chroma is greater than an abscissa of the chroma difference threshold; and adjusting the green component when an absolute value of a difference between an ordinate of the third chroma and an ordinate of the fourth chroma is greater than an ordinate of the chroma difference threshold.

Optionally, adjusting the red component and the blue component includes:

increasing the red component and decreasing the blue component in response to the abscissa of the third chroma being greater than the abscissa of the fourth chroma; and decreasing the red component and increasing the blue component in response to the abscissa of the third chroma being less than the abscissa of the fourth chroma;

and adjusting the green component includes:

increasing the green component in response to the ordinate of the third chroma being greater than the ordinate of the fourth chroma; and decreasing the green component in response to the ordinate of the third chroma being less than the ordinate of the fourth chroma.

Optionally, updating the corrected pixel value corresponding to any original pixel value further includes:

acquiring the pixel value of the third pixel based on the original pixel value and an OETF;

acquiring the third chroma based on the pixel value of the third pixel;

acquiring the pixel value of the fourth pixel based on the corrected pixel value and the OETF;

displaying the fourth pixel based on the pixel value of the fourth pixel; and acquiring the fourth chroma of the fourth pixel.

Optionally, acquiring the fourth chroma of the fourth pixel includes:

acquiring the fourth chroma detected by a colorimeter, wherein the colorimeter is configured to detect the fourth chroma of the fourth pixel.

Optionally, updating the corrected pixel value corresponding to any original pixel value further includes:

sending the pixel value of the third pixel to a signal generator before acquiring the pixel value of the fourth pixel based on the corrected pixel value and the OETF; wherein the signal generator is configured to generate a target signal carrying the pixel value of the third pixel;

acquiring the target signal;

acquiring the original pixel value based on the pixel value of the third pixel carried by the target signal and an EOTF; and determining the corrected pixel value corresponding to the original pixel value in the initial look-up table.

Optionally, correcting the to-be-displayed image based on the target look-up table includes:

acquiring a converted image based on the to-be-displayed image and an EOTF, wherein the pixels in the to-be-displayed image correspond one-to-one to pixels in the converted image, and a pixel value of a pixel in the converted image is determined based on a corresponding pixel and the EOTF;

acquiring a corrected converted image by performing a correction process on the converted image based on the target look-up table; wherein the correction process includes: when the converted image includes a coarsely corrected pixel value and the plurality of original pixel values do not include the coarsely corrected pixel value, determining, in the target look-up table, adjacent pixel values of the coarsely corrected pixel value in the plurality of original pixel values; acquiring a corrected pixel value of the coarsely corrected pixel value based on corrected pixel values corresponding to the adjacent pixel values in the target look-up table; and correcting the coarsely corrected pixel value to be the corrected pixel value of the coarsely corrected pixel value; and acquiring a corrected to-be-displayed image based on the corrected converted image and an OETF, wherein pixels in the corrected to-be-displayed image correspond one-to-one to pixels in the corrected converted image, and a pixel value of a pixel in the corrected to-be-displayed image is determined based on a corresponding pixel and the OETF.

Optionally, acquiring the corrected pixel value of the coarsely corrected pixel value based on the corrected pixel values corresponding to the adjacent pixel values in the target look-up table includes:

acquiring the corrected pixel value of the coarsely corrected pixel value by processing the corrected pixel values corresponding to the adjacent pixel values in the target look-up table with a trilinear interpolation method.

Optionally, the correction process further includes:

when the converted image includes an accurately corrected pixel value and the plurality of original pixel values include the accurately corrected pixel value, correcting the accurately corrected pixel value to be a corrected pixel value corresponding to the accurately corrected pixel value in the target look-up table.

Optionally, each color component in the plurality of original pixel values is a natural number multiple of X, X being a positive integer.

Optionally, $X=2^t$, t being a natural number.

Optionally, each color component in the plurality of original pixel values is a natural number multiple of X, X being a positive integer, and $X=2^t$, t being a natural number; wherein updating the corrected pixel value corresponding to any original pixel value further includes:

acquiring the pixel value of the third pixel based on the original pixel value and an OETF;

acquiring the third chroma based on the pixel value of the third pixel;

sending the pixel value of the third pixel to a signal generator, wherein the signal generator is configured to generate a target signal carrying the pixel value of the third pixel;

acquiring the target signal;

acquiring the original pixel value based on the pixel value of the third pixel carried by the target signal and an EOTF;

determining the corrected pixel value corresponding to the original pixel value in the initial look-up table;

acquiring the pixel value of the fourth pixel based on the corrected pixel value and the OETF;

displaying the fourth pixel based on the pixel value of the fourth pixel; and receiving the fourth chroma detected by a colorimeter, wherein the colorimeter is configured to detect the fourth chroma of the fourth pixel;

and correcting the to-be-displayed image based on the target look-up table includes:

acquiring a converted image based on the to-be-displayed image and the EOTF, wherein pixels in the to-be-displayed image correspond one-to-one to pixels in the converted image, and a pixel value of a pixel in the converted image is determined based on a corresponding pixel and the EOTF;

acquiring a corrected converted image by performing a correction process on the converted image based on the target look-up table; and acquiring a corrected to-be-displayed image based on the corrected converted image and the OETF, wherein pixels in the corrected to-be-displayed image correspond one-to-one to pixels in the corrected converted image, and a pixel value of a pixel in the corrected to-be-displayed image is determined based on a corresponding pixel and the OETF; wherein the correction process includes:

when the converted image includes a coarsely corrected pixel value and the plurality of original pixel values do not include the coarsely corrected pixel value, determining, in the target look-up table, adjacent pixel values of the coarsely corrected pixel value in the plurality of original pixel values;

acquiring the corrected pixel value of the coarsely corrected pixel value by processing corrected pixel values corresponding to the adjacent pixel values in the target look-up table with a trilinear interpolation method;

correcting the coarsely corrected pixel value to be the corrected pixel value of the coarsely corrected pixel value; and when the converted image includes an accurately corrected pixel value and the plurality of original pixel values include the accurately corrected pixel value, correcting the accurately corrected pixel value to be a corrected pixel value corresponding to the accurately corrected pixel value in the target look-up table.

In a second aspect, a system for displaying an image including a display device is provided. The display device is configured to:

acquire a to-be-displayed image;

correct the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and display a corrected to-be-displayed image.

Optionally, the display device is further configured to:

acquire an initial look-up table, wherein the initial look-up table is intended to record corrected pixel values corresponding to the plurality of original pixel values; and acquire the target look-up table by updating the corrected pixel values in the initial look-up table;

wherein updating the corrected pixel value corresponding to any original pixel value includes:

when an absolute value of a difference between a third chroma and a fourth chroma is greater than the chroma difference threshold, adjusting the corrected pixel value at least once until the absolute value of the difference between the third chroma and the fourth chroma as adjusted is less than or equal to the chroma difference threshold; wherein the third chroma is a chroma of a third pixel, a pixel value of the third pixel being acquired by converting the original pixel value, and the fourth chroma is a chroma of a fourth pixel displayed by the display device, a pixel value of the fourth pixel being acquired by converting the corrected pixel value.

Optionally, the system further includes: a colorimeter;

updating the corrected pixel value corresponding to any original pixel value further includes:

acquiring the pixel value of the fourth pixel based on the corrected pixel value and an OETF; displaying the fourth pixel based on the pixel value of the fourth pixel; and acquiring the fourth chroma detected by the colorimeter;

wherein the colorimeter is configured to detect the fourth chroma of the fourth pixel.

Optionally, the system further includes: a signal generator;

updating the corrected pixel value corresponding to any original pixel value further includes:

sending the pixel value of the third pixel to the signal generator; acquiring a target signal that is generated by the signal generator and carries the pixel value of the third pixel;

acquiring the original pixel value based on the pixel value of the third pixel carried by the target signal and an EOTF; and determining the corrected pixel value corresponding to the original pixel value in the initial look-up table;

and wherein the signal generator is configured to generate the target signal.

Optionally, the corrected pixel value includes: a red component, a green component and a blue component; the system further includes: a colorimeter and a signal generator, and each color component in the plurality of original pixel values is a natural number multiple of X, and $X=2^t$, X being a positive integer and t being a natural number;

wherein the display device is configured to:

when an absolute value of a difference between an abscissa of the third chroma and an abscissa of the fourth chroma is greater than an abscissa of the chroma difference threshold, increase the red component and decrease the blue component in response to the abscissa of the third chroma being greater than the abscissa of the fourth chroma; or, decrease the red component and increase the blue component in response to the abscissa of the third chroma being less than the abscissa of the fourth chroma;

when an absolute value of a difference between an ordinate of the third chroma and an ordinate of the fourth chroma is greater than an ordinate of the chroma difference threshold, increase the green component in response to the ordinate of the third chroma being greater than the ordinate of the fourth chroma; or decrease the green component in response to the ordinate of the third chroma being less than the ordinate of the fourth chroma;

acquire a converted image based on the to-be-displayed image and an EOTF, wherein pixels in the to-be-displayed image correspond one-to-one to pixels in the converted image, and a pixel value of a pixel in the converted image is determined based on a corresponding pixel and the EOTF;

acquiring a corrected converted image by performing a correction process on the converted image based on the target look-up table; and acquire a corrected to-be-displayed image based on the corrected converted image and an OETF, wherein pixels in the corrected to-be-displayed image correspond one-to-one to pixel in the corrected converted image, and a pixel value of a pixel in the corrected to-be-displayed image is determined based on a corresponding pixel and the OETF;

wherein the correction process includes: when the converted image includes a coarsely corrected pixel value and the plurality of original pixel values do not include the coarsely corrected pixel value, determining, in the target look-up table, adjacent pixel values of the coarsely corrected pixel value in the plurality of original pixel values; acquiring the corrected pixel value of the coarsely corrected pixel value by processing corrected pixel values corresponding to the adjacent pixel values in the target look-up table with a trilinear interpolation method; correcting the coarsely corrected pixel value to be the corrected pixel value of the coarsely corrected pixel value; when the converted image includes an accurately corrected pixel value and the plurality of original pixel values include the accurately corrected pixel value, correcting the accurately corrected pixel value to be a corrected pixel value corresponding to the accurately corrected pixel value in the target look-up table;

and wherein updating the corrected pixel value corresponding to any original pixel value further includes:

acquiring the pixel value of the third pixel based on the original pixel value and the OETF;

acquiring the third chroma based on the pixel value of the third pixel;

sending the pixel value of the third pixel to the signal generator;

acquiring a target signal that is generated by the signal generator and carries the pixel value of the third pixel;

acquiring the original pixel value based on the pixel value of the third pixel carried by the target signal and the EOTF;

determining the corrected pixel value corresponding to the original pixel value in the initial look-up table;

acquiring the pixel value of the fourth pixel based on the corrected pixel value and the OETF;

displaying the fourth pixel based on the pixel value of the fourth pixel; and acquiring the fourth chroma detected by the colorimeter; wherein the signal generator is configured to generate the target signal; and the colorimeter is configured to detect the fourth chroma of the fourth pixel.

In a fourth aspect, a display device is provided. The display device includes:

a first acquiring module configured to acquire a to-be-displayed image;

a correcting module configured to correct the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and a first displaying module configured to display a corrected to-be-displayed image.

Optionally, the display device further includes:

a second acquiring module configured to, before correcting the to-be-displayed image based on the target look-up table, acquire an initial look-up table, wherein the initial look-up table is intended to record corrected pixel values corresponding to the plurality of original pixel values;

an updating module configured to acquire the target look-up table by updating the corrected pixel values in the initial look-up table;

wherein updating the corrected pixel value corresponding to any original pixel value includes:

when an absolute value of a difference between a third chroma and a fourth chroma is greater than the chroma difference threshold, adjusting the corrected pixel value at least once until the absolute value of the difference between the third chroma and the fourth chroma as adjusted is less than or equal to the chroma difference threshold; wherein the third chroma is a chroma of a third pixel, a pixel value of the third pixel being acquired by converting the original pixel value, and the fourth chroma is a chroma of a fourth pixel displayed by the display device, a pixel value of the fourth pixel being acquired by converting the corrected pixel value.

Optionally, the corrected pixel value includes: a red component, a green component and a blue component; the updating module is configured to:

adjust the red component and the blue component when an absolute value of a difference between an abscissa of the third chroma and an abscissa of the fourth chroma is greater than an abscissa of the chroma difference threshold; and adjust the green component when an absolute value of a difference between an ordinate of the third chroma and an ordinate of the fourth chroma is greater than an ordinate of the chroma difference threshold.

Optionally, adjusting the red component and the blue component includes:

increasing the red component and decreasing the blue component in response to the abscissa of the third chroma being greater than the abscissa of the fourth chroma; and decreasing the red component and increasing the blue component in response to the abscissa of the third chroma being less than the abscissa of the fourth chroma;

and adjusting the green component includes:

increasing the green component in response to the ordinate of the third chroma being greater than the ordinate of the fourth chroma; and decreasing the green component in response to the ordinate of the third chroma being less than the ordinate of the fourth chroma.

Optionally, updating the corrected pixel value corresponding to any original pixel value further includes:

acquiring the pixel value of the third pixel based on the original pixel value and an OETF;

acquiring the third chroma based on the pixel value of the third pixel;

acquiring the pixel value of the fourth pixel based on the corrected pixel value and the OETF;

displaying the fourth pixel based on the pixel value of the fourth pixel; and acquiring the fourth chroma of the fourth pixel.

Optionally, acquiring the fourth chroma of the fourth pixel includes:

acquiring the fourth chroma detected by a colorimeter, wherein the colorimeter is configured to detect the fourth chroma of the fourth pixel.

Optionally, updating the corrected pixel value corresponding to any original pixel value further includes:

sending the pixel value of the third pixel to a signal generator before acquiring the pixel value of the fourth pixel based on the corrected pixel value and the OETF; wherein the signal generator is configured to generate a target signal carrying the pixel value of the third pixel;

acquiring the target signal;

acquiring the original pixel value based on the pixel value of the third pixel carried by the target signal and an EOTF; and determining the corrected pixel value corresponding to the original pixel value in the initial look-up table.

Optionally, the correcting module is configured to:

acquire converted image based on the to-be-displayed image and an EOTF, wherein pixels in the to-be-displayed image correspond one-to-one to pixels in the converted image, and a pixel value of a pixel in the converted image is determined based on a corresponding pixel and the EOTF;

acquire a corrected converted image by performing a correction process on the converted image based on the target look-up table; and acquire a corrected to-be-displayed image based on the corrected converted image and an OETF, wherein pixels in the corrected to-be-displayed image correspond one-to-one to pixels in the corrected converted image, and a pixel value of a pixel in the corrected to-be-displayed image is determined based on a corresponding pixel and the OETF.

Optionally, the correction process includes:

when the converted image includes a coarsely corrected pixel value and the plurality of original pixel values do not include the coarsely corrected pixel value, determining, in the target look-up table, adjacent pixel values of the coarsely corrected pixel value in the plurality of original pixel values;

acquiring a corrected pixel value of the coarsely corrected pixel value based on corrected pixel values corresponding to the adjacent pixel values in the target look-up table;

and correcting the coarsely corrected pixel value to be the corrected pixel value of the coarsely corrected pixel value.

Optionally, the correcting module is configured to:

acquire the corrected pixel value of the coarsely corrected pixel value by processing the corrected pixel values corresponding to the adjacent pixel values in the target look-up table with a trilinear interpolation method.

Optionally, the correction process further includes:

when the converted image includes an accurately corrected pixel value and the plurality of original pixel values include the accurately corrected pixel value, correcting the accurately corrected pixel value to be a corrected pixel value corresponding to the accurately corrected pixel value in the target look-up table.

Optionally, each color component in the plurality of original pixel values is a natural number multiple of X, X being a positive integer.

Optionally, $X=2^t$, t being a natural number.

Optionally, each color component in the plurality of original pixel values is a natural number multiple of X, X being a positive integer, and $X=2^t$, t being a natural number; wherein updating the corrected pixel value corresponding to any original pixel value further includes:

acquiring the pixel value of the third pixel based on the original pixel value and an OETF;

acquiring the third chroma based on the pixel value of the third pixel;

sending the pixel value of the third pixel to a signal generator, wherein the signal generator is configured to generate a target signal carrying the pixel value of the third pixel;

acquiring the target signal;

acquiring the original pixel value based on the pixel value of the third pixel carried by the target signal and an EOTF;

determining the corrected pixel value corresponding to the original pixel value in the initial look-up table;

acquiring the pixel value of the fourth pixel based on the corrected pixel value and the OETF;

displaying the fourth pixel based on the pixel value of the fourth pixel; and receiving the fourth chroma detected by a colorimeter, wherein the colorimeter is configured to detect the fourth chroma of the fourth pixel;

and the correcting module is configured to:

acquire a converted image based on the to-be-displayed image and the EOTF, wherein pixels in the to-be-displayed image correspond one-to-one to pixels in the converted image, and a pixel value of a pixel in the converted image is determined based on a corresponding pixel and the EOTF;

when the converted image includes a coarsely corrected pixel value and the plurality of original pixel values do not include the coarsely corrected pixel value, determine, in the target look-up table, adjacent pixel values of the coarsely corrected pixel value in the plurality of original pixel values;

acquire the corrected pixel value of the coarsely corrected pixel value by processing corrected pixel values corresponding to the adjacent pixel values in the target look-up table with a trilinear interpolation method;

correct the coarsely corrected pixel value to be the corrected pixel value of the coarsely corrected pixel value; and when the converted image includes an accurately corrected pixel value and the plurality of original pixel values include the accurately corrected pixel value, correct the accurately corrected pixel value to be a corrected pixel value corresponding to the accurately corrected pixel value in the target look-up table.

In a fourth aspect, a display device is provided, the display device includes: a display screen, a processor and a memory storing at least one program herein; wherein the processor, when calling the at least one program stored in the memory, causes the display device to perform the method for displaying the image as defined in any design of the first aspect.

In a fifth aspect, a non-transitory computer storage medium is provided, the computer storage medium stores at least one computer program therein;

wherein the at least one computer program, when run in a computer, causes the computer to perform the method for displaying an image as defined in any design of the first aspect.

In a sixth aspect, a computer program product is provided. The computer program product, when run in a computer, causes the computer to perform the method for displaying the image as defined in any design of the first aspect.

DETAILED DESCRIPTION

For clearer descriptions of the principles and technical solutions of the present disclosure, the embodiments of the present disclosure will be further described below with reference to the accompanying drawings.

Figure 1:
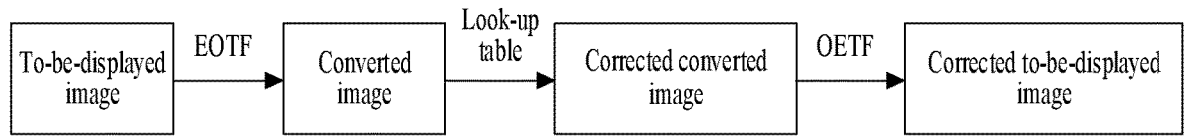
FIG. 1 is a schematic diagram of a method for displaying an image according to an embodiment of the present disclosure.

Pixel values of pixels in a to-be-displayed image of a display device are usually non-linear pixel values. After acquiring the to-be-displayed image, the display device first converts the pixel values of the pixels in the to-be-displayed image into linear pixel values by means of an electro-optical transfer function (EOTF) to acquire a converted image (as shown in FIG. 1). Thereafter, the display device can correct the converted image based on a look-up table to acquire a corrected converted image. Finally, the display device converts pixel values of pixels in the corrected converted image into non-linear pixel values by means of an opto-electrical transfer function (OETF) to acquire a corrected to-be-displayed image, and displays the image.

It should be noted that the to-be-displayed image is usually a captured image, and the pixel values of the pixels in the image are generated based on a scene light signal corresponding to the pixel values. The pixel values of the pixels in the image are non-linear pixel values and there is a non-linear relationship between the non-linear pixel values and the intensity of the corresponding scene light signal. Inversely, there is linear relationship between the linear pixel values and the intensity of the corresponding scene light signal.

The display device corrects an image by means of a look-up table, which can make a chroma of the image displayed by the display device similar to a theoretical chroma of the to-be-displayed image. However, a chroma of the image currently displayed by the display device still has some difference from the theoretical chroma of the to-be-displayed image, which results in distortion of the image.

An embodiment of the present disclosure provides a method for displaying an image. In this method, the display device can correct an image based on a target look-up table according to the present disclosure, such that a chroma of the image displayed by the display device is very similar to a theoretical chroma of a to-be-displayed image, which improves the image display effect.

Figure 2:
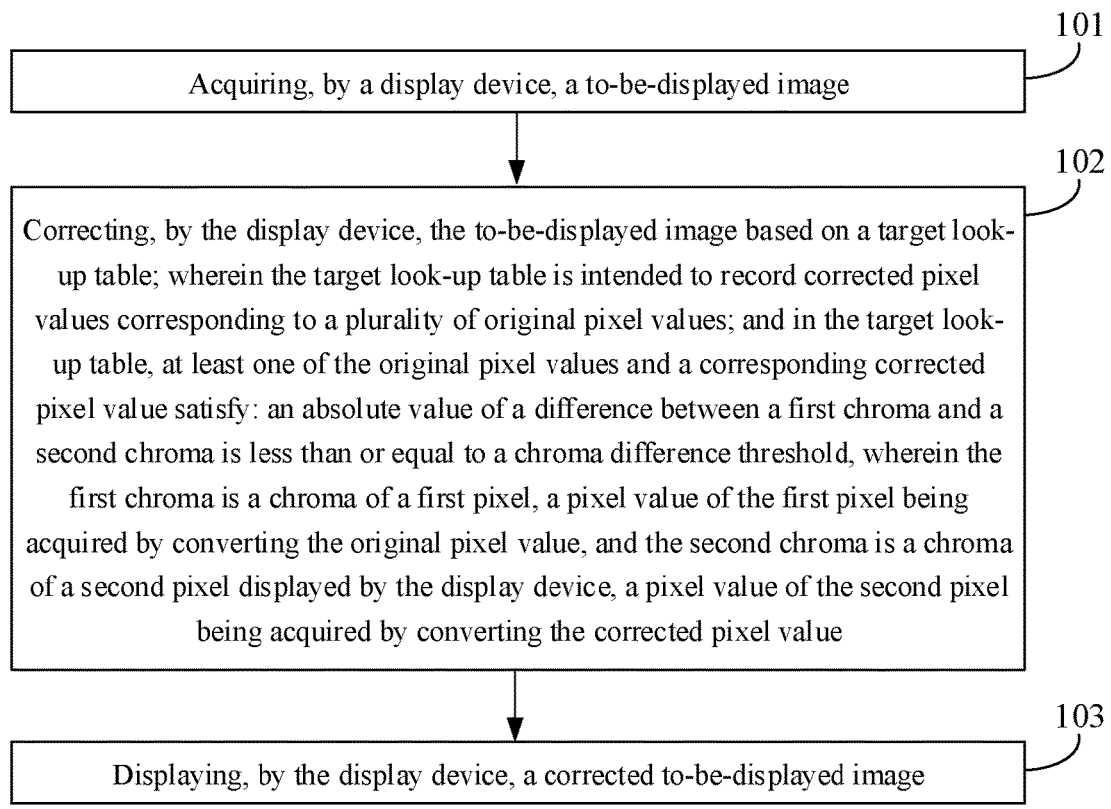
FIG. 2 is a flowchart of a method for displaying an image according to an embodiment of the present disclosure.

As an example, FIG. 2 is a flowchart of a method for displaying an image according to an embodiment of the present disclosure. The method for displaying the image may be executed by a display device, such as a system on chip (SOC) or other modules in the display device. The display device may be any device capable of displaying images, such as a monitor, a TV, a mobile phone, a computer display device, or an electronic reader. A display screen of the display device may be a liquid crystal display (LCD) or an organic light-emitting diode (OLED) display, which is not limited in the embodiment of the present disclosure.

As shown in FIG. 2, a method for displaying an image includes the following steps.

In step 101, a display device acquires a to-be-displayed image.

The to-be-displayed image may be any type of image that needs to be displayed by the display device, which is not limited in the present disclosure. For example, when the display device is a monitor, the monitor is connected with a camera, and the camera sends a captured image to the monitor for display by the monitor. At this time, the to-be-displayed image may be an image captured by the camera.

In step 102, the display device corrects the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value.

For example, the pixel value of the first pixel is determined based on the original pixel value and the OETF, and the pixel value of the second pixel is determined based on the corrected pixel value and the OETF.

Pixel values of pixels in the to-be-displayed image are non-linear pixel values, and the original pixel values and the corrected pixel values in the target look-up table are linear pixel values. Therefore, the display device needs to linearly and non-linearly convert the pixel values in the process of correcting the to-be-displayed image.

Figure 3:
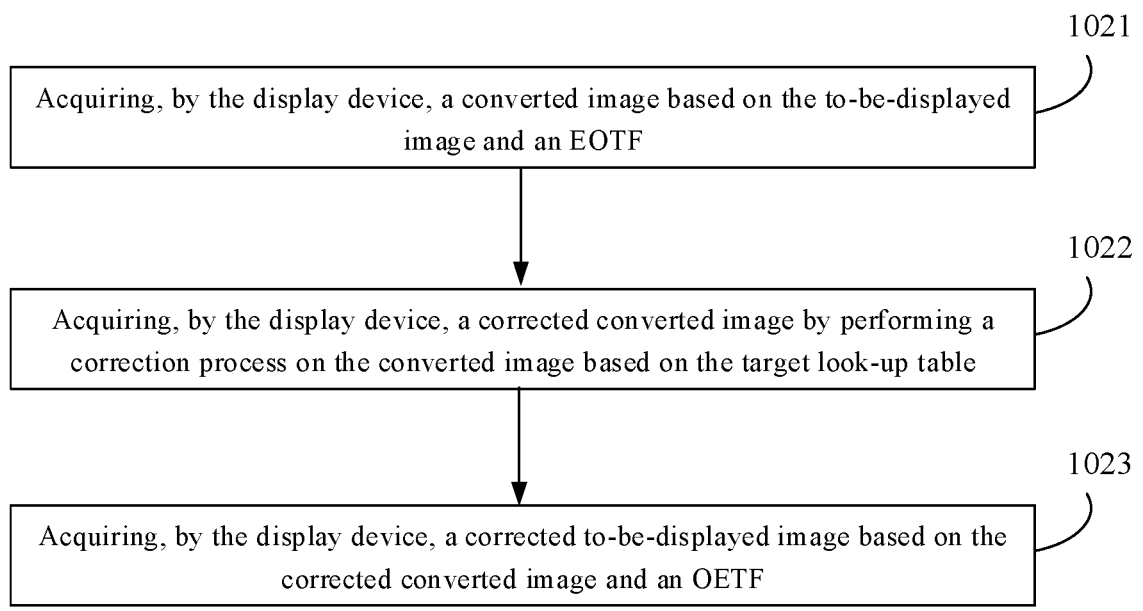
FIG. 3 is a schematic diagram of a process for correcting a to-be-displayed image according to an embodiment of the present disclosure.

As an example, as shown in FIG. 3, step 102 may include the following steps.

In step 1021, the display device acquires a converted image based on the to-be-displayed image and the EOTF.

The pixels in the converted image correspond one-to-one to the pixels in the to-be-displayed image, and a pixel value of a pixel in the converted image is determined based on a pixel value of a corresponding pixel in the to-be-displayed image and the EOTF. For example, the pixel value of the pixel in the to-be-displayed image is substituted into the EOTF to acquire the pixel value of the corresponding pixel in the converted image.

In step 1022, the display device acquires a corrected converted image by performing a correction process on the converted image based on the target look-up table.

When correcting the converted image, the display device may look up, in the plurality of original pixel values in the target look-up table, the pixel value of each of the pixels in the converted image. When the converted image includes an accurately corrected pixel value and the plurality of original pixel values in the target look-up table also include the accurately corrected pixel value, the display device may correct the accurately corrected pixel value to be a corrected pixel value corresponding to the accurately corrected pixel value in the target look-up table. In other words, the above-mentioned correction process may include: correcting the accurately corrected pixel value to be the corrected pixel value corresponding to the accurately corrected pixel value in the target look-up table.

For example, it is assumed that the target look-up table is shown as in Table 1 below, the converted image includes pixels 1, 2, 3, and 4, wherein a pixel value of the pixel 1 is an original pixel value A1 in the target look-up table, a pixel value of the pixel 2 is an original pixel value A2 in the target look-up table, a pixel value of the pixel 3 is an original pixel value A3 in the target look-up table, and a pixel value of the pixel 4 is an original pixel value A4 in the target look-up table. It can be seen that the pixel values of the pixels 1, 2, 3, and 4 are all accurately corrected pixel values. When the display device corrects the converted image, the pixel value of the pixel 1 may be replaced from the original pixel value A1 to the corrected pixel value B 1, the pixel value of the pixel 2 may be replaced from the original pixel value A2 to the corrected pixel value B2, and the pixel value of the pixel 3 may be replaced from the original pixel value A3 to the corrected pixel value B3, and the pixel value of the pixel 4 may be replaced from the original pixel value A4 to the corrected pixel value B4.

TABLE 1

| Original pixel value | Corrected pixel value |
|---|---|
| A1 | B1 |
| A2 | B2 |
| A3 | B3 |
| A4 | B4 |

In step 1023, the display device acquires a corrected to-be-displayed image based on the corrected converted image and the OETF.

Pixels in the corrected to-be-displayed image also correspond one-to-one to pixels in the corrected converted image, and a pixel value of the pixel in the corrected to-be-displayed image is determined based on a corresponding pixel in the corrected converted image and the OETF. For example, the pixel value of the pixel in the corrected converted image is substituted into the OETF to acquire the pixel value of the corresponding pixel in the corrected to-be-displayed image.

In step 103, the display device displays a corrected to-be-displayed image.

After acquiring the corrected to-be-displayed image, the display device may directly display the image.

It should be noted that in the target look-up table, at least one original pixel value (such as all original pixel values) and a corresponding corrected pixel value satisfy a condition. The condition may be that: an absolute value of a difference between a first chroma and a second chroma is less than or equal to a chroma difference threshold, wherein the first chroma is a chroma of a first pixel (which may be understood as a theoretical chroma of the first pixel), a pixel value of the first pixel is determined based on the original pixel value and the OETF; the second chroma is a chroma of a second pixel displayed by the display device, a pixel value of the second pixel is determined based on the corrected pixel value and the OETF.

It is assumed that in the process of correcting the to-be-displayed image, the display device corrects the pixel value of the pixel 1 in the to-be-displayed image to be the pixel value of the pixel 2 in the corrected to-be-displayed image, and the pixel value of the pixel 1 is substituted into the EOTF, such that an original pixel value in the target look-up table that satisfies the above condition may be acquired. Since the original pixel value and a corresponding corrected pixel value satisfy the above condition, an absolute value of a difference between the theoretical chroma of the pixel 1 and the chroma of the pixel 2 displayed by the display device is less than or equal to the chroma difference threshold. It can be seen that the theoretical chroma of the pixel 1 that needs to be displayed by the display device is relatively similar to the chroma of the pixel 2 that is actually displayed by the display device, and thus a color-difference of the display device is small.

In summary, according to the method for displaying the image provided by the embodiment of the present disclosure, the to-be-displayed image is corrected by using the target look-up table. Since at least one original pixel value and the corresponding corrected pixel value in the target look-up table satisfy a condition, such that the first chroma related to the original pixel value is similar to the second chroma related to the corrected pixel value. Therefore, the chroma of the corrected to-be-displayed image that is displayed by the display device differs slightly from the theoretical chroma of the to-be-displayed image before correction, thereby improving the image display effect of the display device.

In the above step 1022, the process of correcting the accurately corrected pixel value in the converted image by the display device is explained. When the converted image includes the coarsely corrected pixel value and the plurality of original pixel values in the target look-up table do not include the coarsely corrected pixel value, the display device may also correct the coarsely corrected pixel value in step 1022.

As an example, for the coarsely corrected pixel value, the above-mentioned correction process may include: the display device determines, in the target look-up table, an adjacent pixel value of the coarsely corrected pixel value in the plurality of original pixel values, and acquires a corrected pixel value of the coarsely corrected pixel value based on a corrected pixel values corresponding to the adjacent pixel value in the target look-up table; and finally, the display device may correct the coarsely corrected pixel value to be the corrected pixel value of the coarsely corrected pixel value. Optionally, the display device may acquire the corrected pixel value of the coarsely corrected pixel value by processing the corrected pixel value corresponding to the adjacent pixel value in the target look-up table with a trilinear interpolation method.

For example, it is assumed that the coarsely corrected pixel value is $P_m(8, 8, 8)$ (which represents that the red component is 8, the green component is 8, and the blue component is 8). 8 adjacent pixel values of the coarsely corrected pixel value in the plurality of original pixel values are respectively: $P_{n1}(0, 0, 0)$ (which represents that the red component is 0, the green component is 0, and the blue component is 0), $P_{n2}(0, 0, 16)$ (which represents that the red component is 0, the green component is 0, and the blue component is 16), $P_{n3}(0, 16, 0)$ (which represents that the red component is 0, the green component is 16, and the blue component is 0), $P_{n4}(0, 16, 16)$ (which represents that the red component is 0, the green component is 16, and the blue component is 16), $P_{n5}(16, 0, 0)$ (which represents that the red component is 16, the green component is 0, and the blue component is 0), $P_{n6}(16, 0, 16)$ (which represents that the red component is 16, the green component is 0, and the blue component is 16), $P_{n7}(16, 16, 0)$ (which represents that the red component is 16, the green component is 16, and the blue component is 0), and $P_{n8}(16, 16, 16)$ (which represents that the red component is 16, the green component is 16, and the blue component is 16). Then, the display device can process the corrected pixel values corresponding to the 8 original pixel values with the trilinear interpolation method to acquire the corrected pixel value corresponding to the coarsely corrected pixel value $P_{n8}(8, 8, 8)$.

Further, the pixel value in the embodiment of the present disclosure may have n components, $n \geq 1$. A number of points are uniformly distributed in an n-dimensional coordinate system with these n components as the coordinate axis, and each point represents one pixel value. Optionally, in the n-dimensional coordinate system, a point representing the coarsely corrected pixel value is referred to as a coarsely corrected pixel value point, and a point representing the original pixel value is referred to as an original pixel value point, and the coarsely corrected pixel value point may have $2^n$ adjacent original pixel value points.

For example, it is assumed that the target look-up table is a 3D LUT, and at this time, the pixel value has three color components, which are a red component, a green component and a blue component. Then, in a three-dimensional coordinate system with these three color components as the coordinate axis, the coarsely corrected pixel value point has eight adjacent original pixel value points. When correcting the coarsely corrected pixel value, the display device looks up these eight original pixel value points in the target look-up table, and calculates the corrected pixel value corresponding to the coarsely corrected pixel value based on corrected pixel values corresponding to eight original pixel values of the eight original pixel value points.

For another example, it is assumed that the pixel value has two color components. Then, in a two-dimensional coordinate system with these two color components as the coordinate axis, the coarsely corrected pixel value point has four adjacent original pixel value points. When adjusting the coarsely corrected pixel value, the display device looks up these four adjacent original pixel value points in the target look-up table, and calculates the corrected pixel value corresponding to the coarsely corrected pixel value based on corrected pixel values corresponding to original pixel values of the four adjacent original pixel value points.

Before the above step 102, the method for displaying the image may further include acquiring, by the display device, the target look-up table.

For example, the display device may first acquire an initial look-up table, and then acquire the target look-up table by updating corrected pixel values in the initial look-up table. The initial look-up table is intended to record the corrected pixel values corresponding to the plurality of original pixel values, and these corrected pixel values may be the same as or different from the corrected pixel values in the target look-up table.

Optionally, the display device usually digitizes images by using 8 bits. At this time, each color component of the pixel value may vary from 0 to 255. It is assumed that the pixel value includes a red component, a green component and a blue component, the display device can display pixels of $256^3$ pixel values. The plurality of original pixel values in the initial look-up table may be selected from the $256^3$ pixel values.

As an example, each color component in the plurality of original pixel values in the initial look-up table may be a natural number multiple of X, and X is a positive integer. For example, $X=2^t$, and t is a natural number.

It is assumed that the pixel value includes a red component, a green component and a blue component. For each of these three color components, starting from the color component 0, the color components may be selected sequentially at a interval of a fixed value X, such that 256/X color components may be obtained, and the 256/X color components are all a natural number multiple of X. For the three color components, a total of 3*256/X color components may be acquired. The 3*256/X color components are permuted and combined according to the three color components to obtain $(256/N)^3$ original pixel values. These original pixel values may be used as the plurality of original pixel values in the initial look-up table.

For example, when X is equal to $2^4=16$, for each color component, a total of 16 color components of 0, 16, 32, 64, ..., 224, 240, and 255 may be obtained. The three color components are permuted and combined to obtain a total of $16^3$ original pixel values, for example, an original pixel value 1 (the red component is 0, the green component is 16, and the blue component is 32), an original pixel value 2 (the red component is 48, the green component is 0, and the blue component is 32), an original pixel value 3 (the red component is 48, the green component is 64, and the blue component is 0) and so on.

Further, after acquiring the initial look-up table, the display device may further acquire the target look-up table by updating the corrected pixel values in the initial look-up table.

Figure 4:
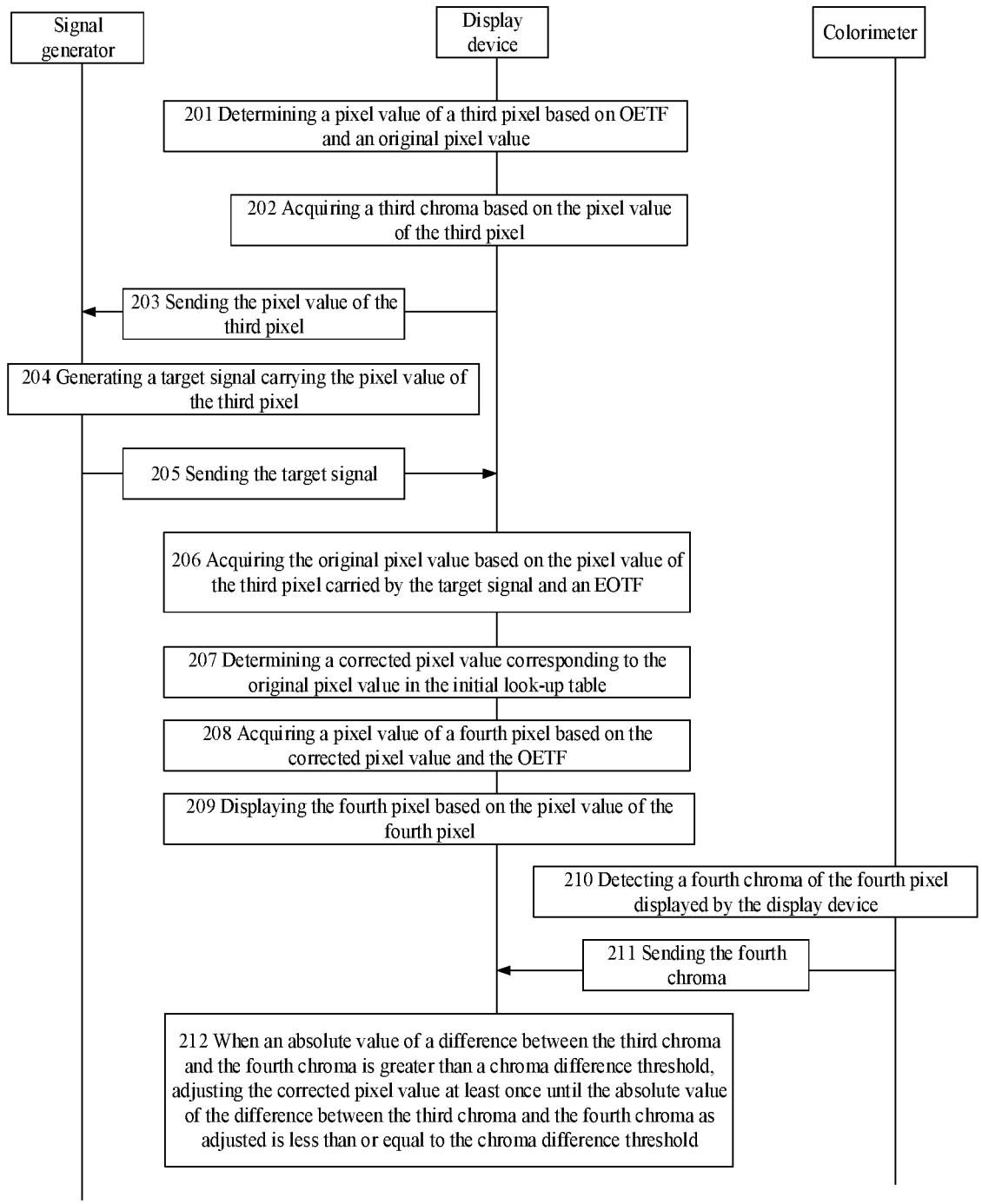
FIG. 4 is a schematic diagram of a process for updating an initial look-up table according to an embodiment of the present disclosure.

As an example, as shown in FIG. 4, for any original pixel value of the plurality of original pixel values in the initial look-up table, updating the corrected pixel value corresponding to the original pixel value may include the following steps.

In step 201, the display device determines a pixel value of a third pixel based on OETF and an original pixel value.

The display device may substitute the original pixel value into the OETF to obtain the pixel value of the third pixel. That is to say, the pixel value of the third pixel is acquired by converting the original pixel value. The original pixel value is a linear pixel value, and the pixel value of the third pixel is a non-linear pixel value.

In step 202, the display device acquires a third chroma based on the pixel value of the third pixel.

After acquiring the pixel value of the third pixel, the display device may acquire the third chroma by means of calculation based on the relationship between the pixel value and the chroma. The third chroma may be understood as a theoretical chroma of the third pixel. In other words, when the display device displays the third pixel, the chroma of the third pixel should theoretically be the third chroma.

The chroma in the embodiment of the present disclosure may be a chroma in any color gamut standard, such as a chroma in the BT.709 color gamut standard or a chroma in the BT.2020 color gamut standard.

In step 203, the display device sends the pixel value of the third pixel to a signal generator.

In step 204, the signal generator generates a target signal carrying the pixel value of the third pixel.

In step 205, the signal generator sends the target signal to the display device.

The display device is connected to the signal generator. After acquiring the pixel value of the third pixel, the display device may also send the pixel value of the third pixel to the signal generator to instruct the signal generator to generate the target signal carrying the pixel value of the third pixel.

As an example, the target signal may be a signal based on which the display device performs a display step in the subsequent step 209, and the signal is related to the area where the display device displays a pixel in step 209, and thus the target signal may be an image signal of the area. The display device can display an image in the area based on the target signal, and a pixel value of each pixel in the image is the pixel value of the third pixel. The area may be an entire display area or a part of display area, such as the area where any pixel point (such as a central pixel point) of the display area is located. In the embodiments of the present disclosure, the area being the entire display area is taken as an example.

After generating the target signal, the signal generator may send the target signal to the display device, such that the display device acquires the target signal.

Through the above step 203 to step 205, the signal generator sends the target signal carrying the pixel value of the third pixel to the display device. Usually, the signal based on which the display device displays the image also comes from the signal generator. By sending the target signal to the display device through the signal generator, the process of displaying the image by the display device can be simulated.

After receiving the target signal, the display device may execute the corresponding display step by the method in the subsequent steps 206 to 209 based on the target signal.

In step 206, the display device acquires the original pixel value based on the pixel value of the third pixel carried by the target signal and the EOTF.

The step 206 may refer to the step 1021, which is not repeated here in the embodiment of the present disclosure.

In step 207, the display device determines a corrected pixel value corresponding to the original pixel value in the initial look-up table.

In step 208, the display device acquires a pixel value of a fourth pixel based on the corrected pixel value and the OETF. In other words, the pixel value of the fourth pixel is acquired by converting the corrected pixel value.

The step 208 may refer to the step 1023, which is not repeated here in the embodiment of the present disclosure.

In step 209, the display device displays the fourth pixel based on the pixel value of the fourth pixel.

If the above-mentioned target signal is a signal of an image that can be displayed by the display device, and a pixel value of each pixel in the image is the pixel value of the third pixel, the display device may convert the pixel value of each pixel in the image to the pixel value of the fourth pixel in steps 206 to 209, and display the image in which the pixel values are converted. At this time, each pixel in the image is the fourth pixel.

In step 210, a colorimeter detects a fourth chroma of the fourth pixel displayed by the display device.

As an example, the colorimeter is configured to detect a chroma of a certain area in the display area of the display device. The area may be the area where the display device displays the fourth pixel in step 209, or a part of the area where the display device displays the fourth pixel in step 209.

The colorimeter may be an imaging colorimeter, a color analyzer, or the like.

In step 211, the colorimeter sends the fourth chroma to the display device.

After detecting the fourth chroma, the colorimeter may send the fourth chroma to the display device, such that the display device acquires the fourth chroma.

The display device may also acquire the fourth chroma in other ways. For example, after displaying the fourth pixel, the display device may send a chroma request to the colorimeter; and after receiving the chroma request, the colorimeter may send the fourth chroma to the display device.

In step 212, when an absolute value of a difference between the third chroma and the fourth chroma is greater than a chroma difference threshold, the display device adjusts the corrected pixel value at least once until the absolute value of the difference between the third chroma and the fourth chroma as adjusted is less than or equal to the chroma difference threshold.

The chroma difference threshold may be determined as required. For example, the abscissa of the chroma difference threshold is 0.1, and the ordinate thereof is also 0.1; for another example, the abscissa of the chroma difference threshold is 0.05, and the ordinate thereof is also 0.05.

The display device acquires the third chroma in step 202, and acquires the fourth chroma in step 211. The display device may compare the absolute value of the difference between the third chroma and the fourth chroma with the chroma difference threshold, so as to determine whether the absolute value of the difference between the third chroma and the fourth chroma is less than or equal to the color difference threshold.

When the absolute value of the difference between the third chroma and the fourth chroma is less than or equal to the chroma difference threshold, the display device determines that the current corrected pixel value is relatively accurate, and there is no need to adjust the corrected pixel value.

When the absolute value of the difference between the third chroma and the fourth chroma is greater than the chroma difference threshold, the display device determines that the current corrected pixel value is relatively inaccurate. At this time, the display device may adjust the corrected pixel value at least once until the absolute value of the difference between the third chroma and the fourth chroma as adjusted is less than or equal to the chroma difference threshold. For example, the display device may adjust the corrected pixel value at least once, and perform step 201 to step 212 once after each adjustment of the corrected pixel value, until the absolute value of the difference between the third chroma and the fourth chroma as adjusted is less than or equal to the chroma difference threshold.

Optionally, the corrected pixel value includes a red component, a green component and a blue component, and the display device may adjust the corrected pixel value based on the abscissa and ordinate of the third chroma and the abscissa and ordinate of the fourth chroma. It should be noted that the chroma has an abscissa and an ordinate, and the points corresponding to the abscissa and the ordinate in the chroma diagram are used to represent the chroma.

As an example, when the absolute value of the difference between the abscissa of the third chroma and the abscissa of the fourth chroma is greater than the abscissa of the chroma difference threshold, the display device may adjust the red component and the blue component in the corrected pixel value. For example, in response to the abscissa of the third chroma being greater than the abscissa of the fourth chroma, the display device may increase the red component and decrease the blue component; and in response to the abscissa of the third chroma being less than the abscissa of the fourth chroma, the display device may decrease the red component and increase the blue component.

As another example, when the absolute value of the difference between the ordinate of the third chroma and the ordinate of the fourth chroma is greater than the ordinate of the chroma difference threshold, the display device may adjust the green component in the corrected pixel value. For example, in response to the ordinate of the third chroma being greater than the ordinate of the fourth chroma, the display device may increase the green component; and in response to the ordinate of the third chroma being less than the ordinate of the fourth chroma, the display device may decrease the green component.

In the above process of adjusting the color components, the amount of each adjustment may be a fixed value or not a fixed value, which is not limited in the embodiment of the present disclosure.

When the display device adjusts the corrected pixel value, the corrected pixel value in the initial look-up table may be adjusted through an Inter Integrated Circuit (I2C) interface in the display device.

In the method shown in FIG. 4, the display device can update the initial look-up table to acquire the target look-up table used in the method for displaying the image shown in FIG. 2. Updating the initial look-up table by the display device may be executed before the display device leaves the factory, or the process may be executed after the display device leaves the factory, which is not limited in the embodiment of the present disclosure. Moreover, after the target look-up table is acquired, the current target look-up table may be used as the initial look-up table, and may be updated by the method shown in FIG. 4 to obtain a more accurate target look-up table.

Based on the method for displaying the image according to the embodiment of the present disclosure, an embodiment of the present disclosure further provides a display system.

Figure 5:
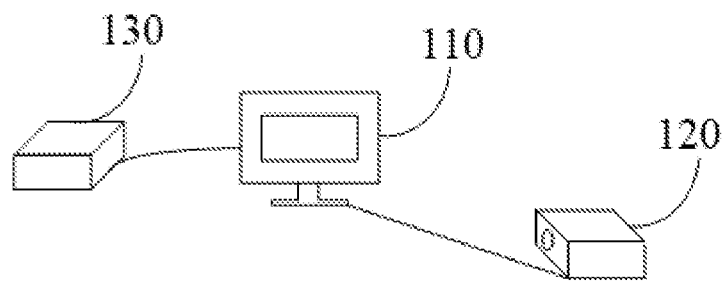
FIG. 5 is a schematic structural diagram of a display system according to an embodiment of the present disclosure.

As shown in FIG. 5, the display system includes a display device 110. The display device 110 may be configured to execute any method for displaying the image according to the embodiments of the present disclosure, such as the method for displaying the image as shown in FIG. 2.

Optionally, the display system further includes a colorimeter 120 connected to the display device 110. The display device 110 is configured to display a fourth pixel, and the colorimeter is configured to detect a fourth chroma of the fourth pixel displayed by the display device 110. The display device 110 is further configured to acquire the fourth chroma.

Optionally, the display system further includes a signal generator 130 connected to the display device 110. The display device 110 is configured to send a pixel value of a third pixel to the signal generator 130, and the signal generator 130 is configured to generate a target signal carrying the pixel value of the third pixel based on the pixel value of the third pixel sent by the display device 110. The signal generator 130 is further configured to input the target signal to the display device 110 to instruct the display device to display an image based on the target signal.

It should be noted that the functions of each of the devices in the display system according to the embodiment of the present disclosure may refer to the corresponding functions in the above-mentioned method for displaying the image, which is not repeated here in the embodiment of the present disclosure.

Figure 6:
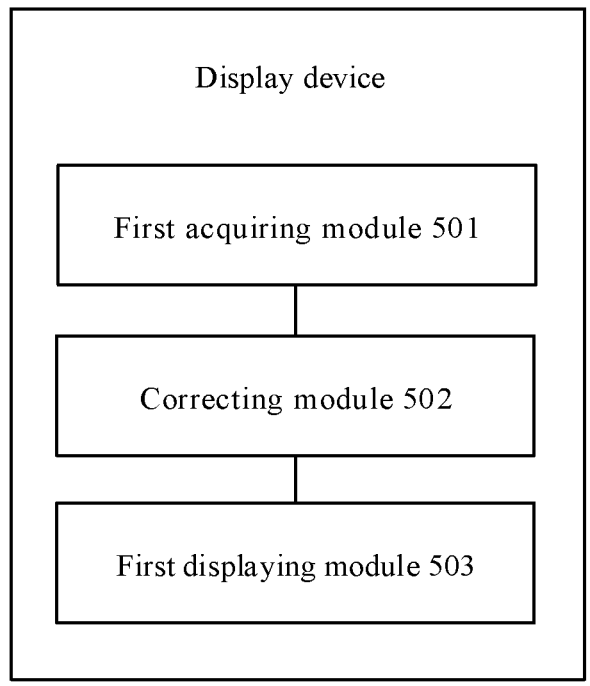
FIG. 6 is a schematic structural diagram of a display device according to an embodiment of the present disclosure.

Based on the method for displaying the image according to the embodiments of the present disclosure, an embodiment of the present disclosure provides a display device. As shown in FIG. 6, the display device includes:

a first acquiring module 501, configured to acquire a to-be-displayed image;

a correcting module 502, configured to correct the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and a first displaying module 503, configured to display a corrected to-be-displayed image.

Optionally, the display device further includes:

a second acquiring module (not shown in FIG. 6), configured to, before correcting the to-be-displayed image based on the target look-up table, acquire an initial look-up table, wherein the initial look-up table is intended to record corrected pixel values corresponding to the plurality of original pixel values;

an updating module (not shown in FIG. 6), configured to acquire the target look-up table by updating the corrected pixel values in the initial look-up table;

wherein updating the corrected pixel value corresponding to any original pixel value includes:

when an absolute value of a difference between a third chroma and a fourth chroma is greater than the chroma difference threshold, adjusting the corrected pixel value at least once until the absolute value of the difference between the third chroma and the fourth chroma as adjusted is less than or equal to the chroma difference threshold; wherein the third chroma is a chroma of a third pixel, a pixel value of the third pixel being acquired by converting the original pixel value, and the fourth chroma is a chroma of a fourth pixel displayed by the display device, a pixel value of the fourth pixel being acquired by converting the corrected pixel value.

Optionally, the corrected pixel value includes: a red component, a green component and a blue component; the updating module is configured to:

adjust the red component and the blue component when an absolute value of a difference between an abscissa of the third chroma and an abscissa of the fourth chroma is greater than an abscissa of the chroma difference threshold; and adjust the green component when an absolute value of a difference between an ordinate of the third chroma and an ordinate of the fourth chroma is greater than an ordinate of the chroma difference threshold.

Optionally, adjusting the red component and the blue component includes:

increasing the red component and decreasing the blue component in response to the abscissa of the third chroma being greater than the abscissa of the fourth chroma; and decreasing the red component and increasing the blue component in response to the abscissa of the third chroma being less than the abscissa of the fourth chroma;

and adjusting the green component includes:

increasing the green component in response to the ordinate of the third chroma being greater than the ordinate of the fourth chroma; and decreasing the green component in response to the ordinate of the third chroma being less than the ordinate of the fourth chroma.

Optionally, updating the corrected pixel value corresponding to any original pixel value further includes:

acquiring the pixel value of the third pixel based on the original pixel value and an OETF;

acquiring the third chroma based on the pixel value of the third pixel;

acquiring the pixel value of the fourth pixel based on the corrected pixel value and the OETF;

displaying the fourth pixel based on the pixel value of the fourth pixel; and acquiring the fourth chroma of the fourth pixel.

Optionally, acquiring the fourth chroma of the fourth pixel includes:

acquiring the fourth chroma detected by a colorimeter, wherein the colorimeter is configured to detect the fourth chroma of the fourth pixel.

Optionally, updating the corrected pixel value corresponding to any original pixel value further includes:

sending the pixel value of the third pixel to a signal generator before acquiring the pixel value of the fourth pixel based on the corrected pixel value and the OETF;

wherein the signal generator is configured to generate a target signal carrying the pixel value of the third pixel;

acquiring the target signal;

acquiring the original pixel value based on the pixel value of the third pixel carried by the target signal and an EOTF; and determining the corrected pixel value corresponding to the original pixel value in the initial look-up table.

Optionally, the correcting module 502 is configured to:

acquire a converted image based on the to-be-displayed image and an EOTF, wherein pixels in the to-be-displayed image correspond one-to-one to pixels in the converted image, and a pixel value of a pixel in the converted image is determined based on a corresponding pixel and the EOTF;

acquire a corrected converted image by performing a correction process on the converted image based on the target look-up table; and acquire a corrected to-be-displayed image based on the corrected converted image and an OETF, wherein pixels in the corrected to-be-displayed image correspond one-to-one to pixels in the corrected converted image, and a pixel value of a pixel in the corrected to-be-displayed image is determined based on a corresponding pixel and the OETF.

The correction process includes:

when the converted image includes a coarsely corrected pixel value and the plurality of original pixel values do not include the coarsely corrected pixel value, determining, in the target look-up table, adjacent pixel values of the coarsely corrected pixel value in the plurality of original pixel values;

acquiring a corrected pixel value of the coarsely corrected pixel value based on corrected pixel values corresponding to the adjacent pixel values in the target look-up table; and correcting the coarsely corrected pixel value to be the corrected pixel value of the coarsely corrected pixel value.

Optionally, the correcting module 502 is configured to:

acquire the corrected pixel value of the coarsely corrected pixel value by processing the corrected pixel values corresponding to the adjacent pixel values in the target look-up table with a trilinear interpolation method.

Optionally, the correction process further includes:

when the converted image includes an accurately corrected pixel value and the plurality of original pixel values include the accurately corrected pixel value, correcting the accurately corrected pixel value to be a corrected pixel value corresponding to the accurately corrected pixel value in the target look-up table.

Optionally, each color component in the plurality of original pixel values is a natural number multiple of X, X being a positive integer.

Optionally, $X=2^t$, t being a natural number.

Based on the method for displaying the image according to the embodiments of the present disclosure, an embodiment of the present disclosure provides another display device. The display device includes a display screen, a processor and a memory. The memory stores at least one program. The processor, when calling the at least one program stored in the memory, causes the display device to perform any method for displaying the image according to the embodiments of the present disclosure, such as the method for displaying the image as shown in FIG. 2.

Figure 7:
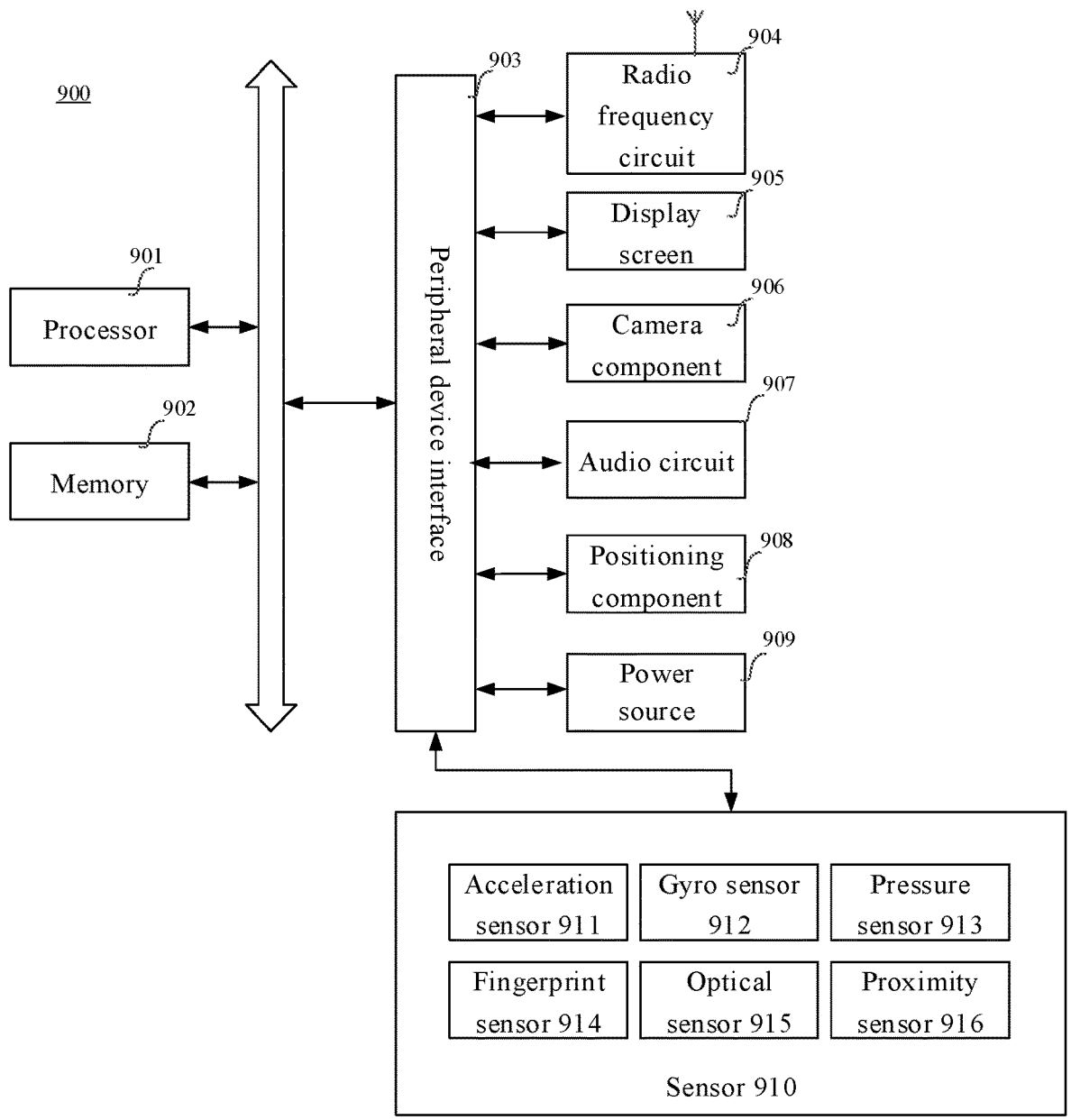
FIG. 7 is a schematic structural diagram of a display device according to another embodiment of the present disclosure.

As an example, FIG. 7 is a schematic structural diagram of another display device according to an embodiment of the present disclosure. The display device 900 may be a monitor, a TV, a mobile phone, an electronic reader, a tablet computer, a moving picture experts group audio layer III (MP3) player, a moving picture experts group audio layer IV (MP4) player, a tablet computer, a notebook computer or a desk computer. The display device 900 may also be called user equipment (UE), a portable terminal, a laptop terminal, a desk terminal, etc.

Generally, the display device 900 includes a processor 901 and a memory 902.

The processor 901 may include one or more processing cores, such as a 4-core processor and an 8-core processor. The processor 901 may be formed by at least one hardware of a digital signal processor (DSP), a field-programmable gate array (FPGA), and a programmable logic array (PLA). The processor 901 may also include a main processor and a coprocessor. The main processor is a processor for processing the data in an awake state, and is also called a central processing unit (CPU). The coprocessor is a low-power-consumption processor for processing the data in a standby state. In some embodiments, the processor 901 may be integrated with a graphics processing unit (GPU), which is configured to render and draw the content that needs to be displayed by a display screen. In some embodiments, the processor 901 may also include an artificial intelligence (AI) processor configured to process computational operations related to machine learning.

The memory 902 may include one or more computer-readable storage mediums, which can be non-transitory. The memory 902 may also include a high-speed random-access memory, as well as a non-volatile memory, such as one or more disk storage devices and flash storage devices. In some embodiments, the non-transitory computer-readable storage medium in the memory 902 is configured to store at least one instruction. The at least one instruction is configured to be performed by the processor 901.

In some embodiments, the display device 900 also optionally includes a peripheral device interface 903 and at least one peripheral device. The processor 901, the memory 902, and the peripheral device interface 903 may be connected by a bus or a signal line. Each peripheral device may be connected to the peripheral device interface 903 by a bus, a signal line or a circuit board. For example, the peripheral device includes at least one of a radio frequency circuit 904, a display screen 905, a camera component 906, an audio circuit 907, a positioning component 908 and a power source 909.

The peripheral device interface 903 may be configured to connect at least one peripheral device associated with an input/output (I/O) to the processor 901 and the memory 902. In some embodiments, the processor 901, the memory 902 and the peripheral device interface 903 are integrated on a same chip or circuit board. In some other embodiments, any one or two of the processor 901, the memory 902 and the peripheral device interface 903 may be implemented on a separate chip or circuit board, which is not limited in the present embodiment.

The radio frequency circuit 904 is configured to receive and transmit a radio frequency (RF) signal, which is also referred to as an electromagnetic signal. The radio frequency circuit 904 communicates with a communication network and other communication devices via the electromagnetic signal. The radio frequency circuit 904 converts the electrical signal into the electromagnetic signal for transmission, or converts the received electromagnetic signal into the electrical signal. Optionally, the radio frequency circuit 904 includes an antenna system, an RF transceiver, one or more amplifiers, a tuner, an oscillator, a digital signal processor, a codec chipset, a subscriber identity module card, and the like. The radio frequency circuit 904 can communicate with other terminals via at least one wireless communication protocol. The wireless communication protocol includes, but not limited to, the world wide web, a metropolitan area network, an intranet, various generations of mobile communication networks (2G, 3G, 4G, and 5G), a wireless local area network, and/or a wireless fidelity (WiFi) network. In some embodiments, the RF circuit 904 may also include near field communication (NFC) related circuits, which is not limited in the present disclosure.

The display screen 905 is configured to display a user interface (UI). The UI may include graphics, text, icons, videos, and any combination thereof. When the display screen 905 is a touch display screen, the display screen 905 also has the capacity to acquire touch signals on or over the surface of the display screen 905. The touch signal may be input into the processor 901 as a control signal for processing. At this time, the display screen 905 may also be configured to provide virtual buttons and/or virtual keyboards, which are also referred to as soft buttons and/or soft keyboards. In some embodiments, one display screen 905 may be disposed on the front panel of the display device 900. In some other embodiments, at least two display screens 905 may be disposed respectively on different surfaces of the display device 900 or in a folded design. In still other embodiments, the display screen 905 may be a flexible display screen, which is disposed on a curved surface or fold plane of the display device 900. The display screen 905 may be even further provided as a non-rectangular irregular pattern, i.e., a special-shaped screen. The display screen 905 may be made from materials such as a liquid crystal display (LCD) and an organic light-emitting diode (OLED).

The camera component 906 is configured to capture images or videos. Optically, the camera component 906 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 906 may also include a flashlight. The flashlight may be a mono-color temperature flashlight or a two-color temperature flashlight. The two-color temperature flashlight is a combination of a warm flashlight and a cold flashlight and can be used for light compensation at different color temperatures.

The audio circuit 907 may include a microphone and a speaker. The microphone is configured to collect sound waves of users and environments, and convert the sound waves into electrical signals which are input into the processor 901 for processing, or input into the RF circuit 904 for voice communication. For the purpose of stereo acquisition or noise reduction, there may be a plurality of microphones respectively disposed at different locations of the display device 900. The microphone may also be an array microphone or an omnidirectional acquisition microphone. The speaker is then configured to convert the electrical signals from the processor 901 or the radio frequency circuit 904 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 907 may also include a headphone jack.

The positioning component 908 is configured to position a current geographic location of the display device 900 to implement navigation or location based service (LBS). The positioning component 908 may be the United States' Global Positioning System (GPS), Russia's Global Navigation Satellite System (GLONASS), China's BeiDou Navigation Satellite System (BDS), and the European Union's Galileo.

The power source 909 is configured to power up various components in the display device 900. The power source 909 may be alternating current, direct current, a disposable battery, or a rechargeable battery. When the power source 909 includes the rechargeable battery, the rechargeable battery may a wired rechargeable battery or a wireless rechargeable battery. The wired rechargeable battery is a battery charged by a cable line, and wireless rechargeable battery is charged by a wireless coil. The rechargeable battery may also support the fast-charging technology.

In some embodiments, the display device 900 also includes one or more sensors 910. The one or more sensors 910 include, but not limited to, an acceleration sensor 911, a gyro sensor 912, a pressure sensor 913, a fingerprint sensor 914, an optical sensor 915 and a proximity sensor 916.

The acceleration sensor 911 may detect magnitudes of accelerations on three coordinate axes of a coordinate system established by the display device 900. For example, the acceleration sensor 911 may be configured to detect components of a gravitational acceleration on the three coordinate axes. The processor 901 may control the display screen 905 to display a user interface in a landscape view or a portrait view according to a gravity acceleration signal collected by the acceleration sensor 911. The acceleration sensor 911 may also be configured to collect motion data of a game or a user.

The gyro sensor 912 can detect a body direction and a rotation angle of the display device 900, and can cooperate with the acceleration sensor 911 to collect a 3D motion of the user on the display device 900. Based on the data collected by the gyro sensor 912, the processor 901 can serve the following functions: motion sensing (such as changing the UI according to a user's tilt operation), image stabilization during shooting, game control and inertial navigation.

The pressure sensor 913 may be disposed on a side frame of the display device 900 and/or a lower layer of the display screen 905. When the pressure sensor 913 is disposed on the side frame of the display device 900, a user's holding signal to the display device 900 can be detected. The processor 901 can perform left-right hand recognition or quick operation according to the holding signal collected by the pressure sensor 913. When the pressure sensor 913 is disposed on the lower layer of the display screen 905, the processor 901 controls an operable control on the UI according to a user's pressure operation on the display screen 905. The operable control includes at least one of a button control, a scroll bar control, an icon control and a menu control.

The fingerprint sensor 914 is configured to collect a user's fingerprint. The processor 901 identifies the user's identity based on the fingerprint collected by the fingerprint sensor

914, or the fingerprint sensor 914 identifies the user's identity based on the collected fingerprint. When the user's identity is identified as trusted, the processor 901 authorizes the user to perform related sensitive operations, such as unlocking the screen, viewing encrypted information, downloading software, paying, and changing settings. The fingerprint sensor 914 may be disposed on the front, back, or side of the display device 900. When the display device 900 is provided with a physical button or a manufacturer's Logo, the fingerprint sensor 914 may be integrated with the physical button or the manufacturer's Logo.

The optical sensor 915 is configured to collect ambient light intensity. In one embodiment, the processor 901 may control the display brightness of the display screen 905 according to the ambient light intensity collected by the optical sensor 915. For example, when the ambient light intensity is high, the display brightness of the display screen 905 is increased; and when the ambient light intensity is low, the display brightness of the display screen 905 is decreased. In another embodiment, the processor 901 may also dynamically adjust shooting parameters of the camera component 906 according to the ambient light intensity collected by the optical sensor 915.

The proximity sensor 916, also referred to as a distance sensor, is usually disposed on the front panel of the display device 900. The proximity sensor 916 is configured to capture a distance between the user and a front surface of the display device 900. In one embodiment, when the proximity sensor 916 detects that the distance between the user and the front surface of the display device 900 becomes gradually smaller, the processor 901 controls the display screen 905 to switch from a screen-on state to a screen-off state. When the proximity sensor 916 detects that the distance between the user and the front surface of the display device 900 gradually increases, the processor 901 controls the display screen 905 to switch from the screen-off state to the screen-on state.

It will be understood by those skilled in the art that the structure shown in FIG. 7 does not constitute a limitation to the display device 900, and may include more or less components than those illustrated, or combine some components or adopt different component arrangements.

An embodiment of the present disclosure further provides a non-transitory computer storage medium storing at least one computer program. The at least one computer program, when run in a computer, causes the computer to perform any method for displaying the image according to the embodiments of the present disclosure, such as the method for displaying the image as shown in FIG. 2.

An embodiment of the present disclosure further provides a computer program product. The computer program product, when run in a computer, causes the computer to perform any method for displaying the image according to the embodiments of the present disclosure, such as the method for displaying the image as shown in FIG. 2.

In the present disclosure, the terms "first" and "second" are merely configured to describe but not denote or imply any relative importance. The term "at least one" means one or more, and "a plurality of" means two or more, unless otherwise expressly provided. The term "and/or" only describes an association relationship between associated objects and indicates that there may be three relationships. For example, A and/or B may indicate that there are three cases where A exists separately, A and B exist at the same time, and B exists separately.

The method embodiments, the display device embodiments and the display system embodiments of the present disclosure may be cross referenced, which is not limited in the embodiments of the present disclosure. The sequence of the operations in the method embodiments provided by the embodiments of the present disclosure may be adjusted appropriately, and the operations may be deleted or added according to the situation. Within the technical scope disclosed in the present disclosure, any variations of the method easily derived by a person of ordinary skill in the art shall fall within the protection scope of the present disclosure, which is not repeated here.

It should be understood that in the embodiments of the present disclosure, the disclosed systems and devices may be realized by other formation manners. For example, the device embodiments described above are merely schematic. For example, the partitioning of the modules may be a logical functional partitioning. There may be other partitioning modes during actual implementation. For example, multiple modules may be combined or integrated into another system, or some features may be ignored or not executed. In addition, mutual coupling or direct coupling or communication connection that is shown or discussed may be indirect coupling or communication connection of the devices or modules through some interfaces, and may be in electrical or other forms.

The units described as separate components may or may not be physically separate, and the components described as units may or may not be physical units, that is, may be disposed in one place, or may be distributed on multiple devices. Part or all of the units may be selected according to actual needs to achieve the objectives of the solutions of the embodiments of the present disclosure.

The foregoing descriptions are merely optional embodiments of the present disclosure, and are not intended to limit the present disclosure. Within the technical scope disclosed by the disclosure, equivalent modifications or substitutions can be easily conceived of by those skilled in the art, and are within the protection scope of the present disclosure. Therefore, the protection scope of the present disclosure shall be defined by the protection scope of the claims.

What is claimed is:

1. A method for displaying an image, applicable to a display device and comprising:
    acquiring a to-be-displayed image;
    correcting the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and
    displaying a corrected to-be-displayed image.

2. The method according to claim 1, before correcting the to-be-displayed image based on the target look-up table, further comprising:
    acquiring an initial look-up table, wherein the initial look-up table is intended to record corrected pixel values corresponding to the plurality of original pixel values; and
    acquiring the target look-up table by updating the corrected pixel values in the initial look-up table;

wherein updating the corrected pixel value corresponding to any original pixel value comprises:

when an absolute value of a difference between a third chroma and a fourth chroma is greater than the chroma difference threshold, adjusting the corrected pixel value at least once until the absolute value of the difference between the third chroma and the fourth chroma as adjusted is less than or equal to the chroma difference threshold; wherein the third chroma is a chroma of a third pixel, a pixel value of the third pixel being acquired by converting the original pixel value, and the fourth chroma is a chroma of a fourth pixel displayed by the display device, a pixel value of the fourth pixel being acquired by converting the corrected pixel value.

3. The method according to claim 2, wherein the corrected pixel value comprises: a red component, a green component and a blue component;

adjusting the corrected pixel value comprises:

adjusting the red component and the blue component when an absolute value of a difference between an abscissa of the third chroma and an abscissa of the fourth chroma is greater than an abscissa of the chroma difference threshold; and adjusting the green component when an absolute value of a difference between an ordinate of the third chroma and an ordinate of the fourth chroma is greater than an ordinate of the chroma difference threshold.

4. The method according to claim 3, wherein adjusting the red component and the blue component comprises:

increasing the red component and decreasing the blue component in response to the abscissa of the third chroma being greater than the abscissa of the fourth chroma; and decreasing the red component and increasing the blue component in response to the abscissa of the third chroma being less than the abscissa of the fourth chroma;

and adjusting the green component comprises:

increasing the green component in response to the ordinate of the third chroma being greater than the ordinate of the fourth chroma; and decreasing the green component in response to the ordinate of the third chroma being less than the ordinate of the fourth chroma.

5. The method according to claim 4, wherein each color component in the plurality of original pixel values is a natural number multiple of X, X being a positive integer, and $X=2^t$, t being a natural number; wherein updating the corrected pixel value corresponding to any original pixel value further comprises:

acquiring the pixel value of the third pixel based on the original pixel value and an OETF;

acquiring the third chroma based on the pixel value of the third pixel;

sending the pixel value of the third pixel to a signal generator, wherein the signal generator is configured to generate a target signal carrying the pixel value of the third pixel;

acquiring the target signal;

acquiring the original pixel value based on the pixel value of the third pixel carried by the target signal and an EOTF;

determining the corrected pixel value corresponding to the original pixel value in the initial look-up table;

acquiring the pixel value of the fourth pixel based on the corrected pixel value and the OETF;

displaying the fourth pixel based on the pixel value of the fourth pixel; and receiving the fourth chroma detected by a colorimeter, wherein the colorimeter is configured to detect the fourth chroma of the fourth pixel;

and correcting the to-be-displayed image based on the target look-up table comprises:

acquiring a converted image based on the to-be-displayed image and the EOTF, wherein pixels in the to-be-displayed image correspond one-to-one to pixels in the converted image, and a pixel value of a pixel in the converted image is determined based on a corresponding pixel and the EOTF;

acquiring a corrected converted image by performing a correction process on the converted image based on the target look-up table;

acquiring a corrected to-be-displayed image based on the corrected converted image and the OETF, wherein pixels in the corrected to-be-displayed image correspond one-to-one to pixels in the corrected converted image, and a pixel value of a pixel in the corrected to-be-displayed image is determined based on a corresponding pixel and the OETF; wherein the correction process comprises:

when the converted image comprises a coarsely corrected pixel value and the plurality of original pixel values do not comprise the coarsely corrected pixel value, determining, in the target look-up table, adjacent pixel values of the coarsely corrected pixel value in the plurality of original pixel values;

acquiring the corrected pixel value of the coarsely corrected pixel value by processing corrected pixel values corresponding to the adjacent pixel values in the target look-up table with a trilinear interpolation method;

correcting the coarsely corrected pixel value to be the corrected pixel value of the coarsely corrected pixel value; and when the converted image comprises an accurately corrected pixel value and the plurality of original pixel values comprise the accurately corrected pixel value, correcting the accurately corrected pixel value to be a corrected pixel value corresponding to the accurately corrected pixel value in the target look-up table.

6. The method according to claim 2, wherein updating the corrected pixel value corresponding to any original pixel value further comprises:

acquiring the pixel value of the third pixel based on the original pixel value and an opto-electrical transfer function (OETF);

acquiring the third chroma based on the pixel value of the third pixel;

acquiring the pixel value of the fourth pixel based on the corrected pixel value and the OETF;

displaying the fourth pixel based on the pixel value of the fourth pixel; and acquiring the fourth chroma of the fourth pixel.

7. The method according to claim 5, wherein acquiring the fourth chroma of the fourth pixel comprises:

acquiring the fourth chroma detected by a colorimeter, wherein the colorimeter is configured to detect the fourth chroma of the fourth pixel.

8. The method according to claim 5, wherein updating the corrected pixel value corresponding to any original pixel value further comprises:

sending the pixel value of the third pixel to a signal generator before acquiring the pixel value of the fourth pixel based on the corrected pixel value and the OETF;

wherein the signal generator is configured to generate a target signal carrying the pixel value of the third pixel;
acquiring the target signal;
acquiring the original pixel value based on the pixel value of the third pixel carried by the target signal and an electro-optical transfer function (EOTF); and
determining the corrected pixel value corresponding to the original pixel value in the initial look-up table.

9. The method according to claim 1, wherein correcting the to-be-displayed image based on the target look-up table comprises:
acquiring a converted image based on the to-be-displayed image and an EOTF, wherein pixels in the to-be-displayed image correspond one-to-one to pixels in the converted image, and a pixel value of a pixel in the converted image is determined based on a corresponding pixel and the EOTF;
acquiring a corrected converted image by performing a correction process on the converted image based on the target look-up table; wherein the correction process comprises: when the converted image comprises a coarsely corrected pixel value and the plurality of original pixel values do not comprise the coarsely corrected pixel value, determining, in the target look-up table, adjacent pixel values of the coarsely corrected pixel value in the plurality of original pixel values; acquiring a corrected pixel value of the coarsely corrected pixel value based on corrected pixel values corresponding to the adjacent pixel values in the target look-up table; and correcting the coarsely corrected pixel value to be the corrected pixel value of the coarsely corrected pixel value; and
acquiring a corrected to-be-displayed image based on the corrected converted image and an OETF, wherein pixels in the corrected to-be-displayed image correspond one-to-one to pixels in the corrected converted image, and a pixel value of a pixel in the corrected to-be-displayed image is determined based on a corresponding pixel and the OETF.

10. The method according to claim 9, acquiring the corrected pixel value of the coarsely corrected pixel value based on the corrected pixel values corresponding to the adjacent pixel values in the target look-up table comprises:
acquiring the corrected pixel value of the coarsely corrected pixel value by processing the corrected pixel values corresponding to the adjacent pixel values in the target look-up table with a trilinear interpolation method.

11. The method according to claim 8, wherein the correction process further comprises:
when the converted image comprises an accurately corrected pixel value and the plurality of original pixel values comprise the accurately corrected pixel value, correcting the accurately corrected pixel value to be a corrected pixel value corresponding to the accurately corrected pixel value in the target look-up table.

12. The method according to claim 1, wherein each color component in the plurality of original pixel values is a natural number multiple of X, X being a positive integer.

13. The method according to claim 11, wherein $X=2^t$, t being a natural number.

14. A system for displaying an image comprising a display device, wherein the display device is configured to:
acquire a to-be-displayed image;
correct the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and
display a corrected to-be-displayed image.

15. The system according to claim 14, wherein the display device is further configured to:
acquire an initial look-up table, wherein the initial look-up table is intended to record corrected pixel values corresponding to the plurality of original pixel values; and
acquire the target look-up table by updating the corrected pixel values in the initial look-up table;
wherein updating the corrected pixel value corresponding to any original pixel value comprises:
when an absolute value of a difference between a third chroma and a fourth chroma is greater than the chroma difference threshold, adjusting the corrected pixel value at least once until the absolute value of the difference between the third chroma and the fourth chroma as adjusted is less than or equal to the chroma difference threshold; wherein the third chroma is a chroma of a third pixel, a pixel value of the third pixel being acquired by converting the original pixel value, and the fourth chroma is a chroma of a fourth pixel displayed by the display device, a pixel value of the fourth pixel being acquired by converting the corrected pixel value.

16. The system according to claim 15, further comprising: a colorimeter;
wherein updating the corrected pixel value corresponding to any original pixel value further comprises:
acquiring the pixel value of the fourth pixel based on the corrected pixel value and an OETF; displaying the fourth pixel based on the pixel value of the fourth pixel; and acquiring the fourth chroma detected by the colorimeter; wherein the colorimeter is configured to detect the fourth chroma of the fourth pixel.

17. The system according to claim 15, further comprising: a signal generator;
wherein updating the corrected pixel value corresponding to any original pixel value further comprises:
sending the pixel value of the third pixel to the signal generator; acquiring a target signal that is generated by the signal generator and carries the pixel value of the third pixel; acquiring the original pixel value based on the pixel value of the third pixel carried by the target signal and an EOTF; and determining the corrected pixel value corresponding to the original pixel value in the initial look-up table; wherein the signal generator is configured to generate the target signal.

18. The system according to claim 15, wherein the corrected pixel value comprises: a red component, a green component and a blue component; the system further comprises a colorimeter and a signal generator, and each color component in the plurality of original pixel values is a natural number multiple of X, and $X=2^t$, X being a positive integer and t being a natural number;
wherein the display device is configured to:

when an absolute value of a difference between an abscissa of the third chroma and an abscissa of the fourth chroma is greater than an abscissa of the chroma difference threshold, increase the red component and decrease the blue component in response to the abscissa of the third chroma being greater than the abscissa of the fourth chroma; or, decrease the red component and increase the blue component in response to the abscissa of the third chroma being less than the abscissa of the fourth chroma;

when an absolute value of a difference between an ordinate of the third chroma and an ordinate of the fourth chroma is greater than an ordinate of the chroma difference threshold, increase the green component in response to the ordinate of the third chroma being greater than the ordinate of the fourth chroma; or, decrease the green component in response to the ordinate of the third chroma being less than the ordinate of the fourth chroma;

acquire a converted image based on the to-be-displayed image and an EOTF, wherein pixels in the to-be-displayed image correspond one-to-one to pixels in the converted image, and a pixel value of a pixel in the converted image is determined based on a corresponding pixel and the EOTF;

acquire a corrected converted image by performing a correction process on the converted image based on the target look-up table; wherein the correction process comprises: when the converted image comprises a coarsely corrected pixel value and the plurality of original pixel values do not comprise the coarsely corrected pixel value, determining, in the target look-up table, adjacent pixel values of the coarsely corrected pixel value in the plurality of original pixel values; acquiring the corrected pixel value of the coarsely corrected pixel value by processing corrected pixel values corresponding to the adjacent pixel values in the target look-up table with a trilinear interpolation method; correcting the coarsely corrected pixel value to be the corrected pixel value of the coarsely corrected pixel value; when the converted image comprises an accurately corrected pixel value and the plurality of original pixel values comprise the accurately corrected pixel value, correcting the accurately corrected pixel value to be a corrected pixel value corresponding to the accurately corrected pixel value in the target look-up table; and acquire a corrected to-be-displayed image based on the corrected converted image and an OETF, wherein pixels in the corrected to-be-displayed image correspond one-to-one to pixel in the corrected converted image, and a pixel value of a pixel in the corrected to-be-displayed image is determined based on a corresponding pixel and the OETF;

wherein updating the corrected pixel value corresponding to any original pixel value further comprises:

acquiring the pixel value of the third pixel based on the original pixel value and the OETF;

acquiring the third chroma based on the pixel value of the third pixel;

sending the pixel value of the third pixel to the signal generator;

acquiring a target signal that is generated by the signal generator and carries the pixel value of the third pixel;

acquiring the original pixel value based on the pixel value of the third pixel carried by the target signal and the EOTF;

determining the corrected pixel value corresponding to the original pixel value in the initial look-up table;

acquiring the pixel value of the fourth pixel based on the corrected pixel value and the OETF;

displaying the fourth pixel based on the pixel value of the fourth pixel; and acquiring the fourth chroma detected by the colorimeter;

wherein the signal generator is configured to generate the target signal; and the colorimeter is configured to detect the fourth chroma of the fourth pixel.

19. A display device, comprising: a display screen, a processor and a memory storing at least one program therein; wherein the processor, when calling the at least one program stored in the memory, causes the display device to perform a method for displaying an image comprising:

acquiring a to-be-displayed image;

correcting the to-be-displayed image based on a target look-up table, wherein the target look-up table is intended to record corrected pixel values corresponding to a plurality of original pixel values; and in the target look-up table, at least one of the original pixel values and a corresponding corrected pixel value satisfy: an absolute value of a difference between a first chroma and a second chroma is less than or equal to a chroma difference threshold, wherein the first chroma is a chroma of a first pixel, a pixel value of the first pixel being acquired by converting the original pixel value, and the second chroma is a chroma of a second pixel displayed by the display device, a pixel value of the second pixel being acquired by converting the corrected pixel value; and displaying a corrected to-be-displayed image.

20. A non-transitory computer storage medium storing at least one computer program therein;

wherein the at least one computer program, when run in a computer, causes the computer to perform the method for displaying the image as defined in claim 1.

* * * * *